United States Patent [19]

Malter

[11] Patent Number: 4,860,323

[45] Date of Patent: Aug. 22, 1989

[54] METHOD AND DEVICE FOR THE ACQUISITION OF SYNCHRONIZATION BITS IN DATA TRANSMISSION SYSTEMS

[75] Inventor: Remi Malter, Poissy, France

[73] Assignee: Thomson-CSF, Paris, France

[21] Appl. No.: 213,074

[22] Filed: Jun. 29, 1988

[30] Foreign Application Priority Data

Jun. 30, 1987 [FR] France .................. 87 09236

[51] Int. Cl.$^4$ ........................... H04L 7/04
[52] U.S. Cl. ................... 375/111; 370/105
[58] Field of Search ........... 375/106, 113, 114, 115, 375/116, 111; 370/105, 106; 371/42, 46; 340/825.14

[56] References Cited

U.S. PATENT DOCUMENTS

| | | | |
|---|---|---|---|
| 3,648,237 | 3/1972 | Frey | 340/146.1 |
| 4,002,845 | 1/1977 | Kaul et al. | 375/106 |
| 4,306,308 | 12/1981 | Nossen | 375/113 |
| 4,310,921 | 1/1982 | Rosa | 375/114 |
| 4,517,679 | 5/1985 | Clark et al. | 375/115 |
| 4,638,497 | 1/1987 | Komatsu et al. | 375/106 |
| 4,697,277 | 9/1987 | Van Rassel | 375/106 |
| 4,748,623 | 5/1988 | Fujimoto | 375/116 |

FOREIGN PATENT DOCUMENTS

| | | |
|---|---|---|
| 2345491 | 3/1975 | Fed. Rep. of Germany . |
| 57-9147 | 4/1982 | Japan . |
| 60-9241 | 3/1985 | Japan . |
| 60-227542 | 4/1986 | Japan . |
| 1401261 | 7/1975 | United Kingdom . |

OTHER PUBLICATIONS

IEEE Transactions on Communication Technology, vol. COM-16, No. 1, Fevrier 1968, pp. 142-148; T. A. Hawkes et al.: "Construction and Performance of a PCM Frame Synchronizer with Self-Varying Threshold".

Primary Examiner—Benedict V. Safourek
Assistant Examiner—Stephen Chin
Attorney, Agent, or Firm—Cushman, Darby & Cushman

[57] ABSTRACT

The method comprises, at each receiver of the system, the steps of making a comparison, modulo the number of bits contained in a frame of transmitted data, of the value of each of the bits received with the pre-supposed values of the synchronization bits, totalizing the results of the comparisons made on each bit and identifying, in the received bits, the bit positions modulo the number of bits contained in a frame for which the totals obtained are greater than an adjustable threshold value, modulo the number of bits contained in a frame, as a function of the number of comparisons already made for each bit of a frame and adapted according to the probabilities of false alarms and of non-detection which characterize the transmission.

12 Claims, 4 Drawing Sheets

FIG_1
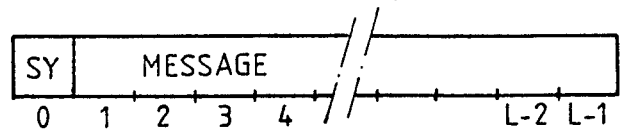
FIG_2
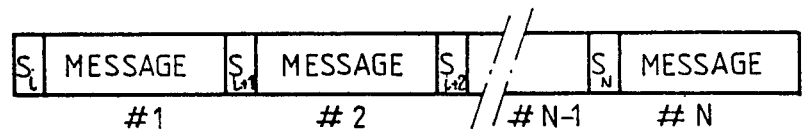
FIG_5-A
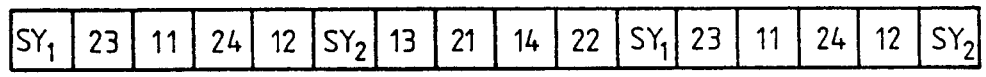
FIG_5-B
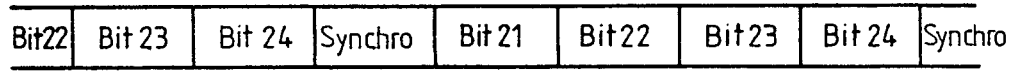
FIG_5-C
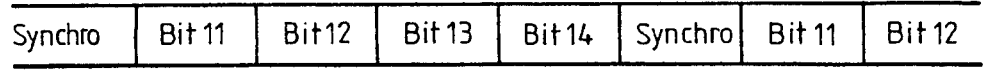

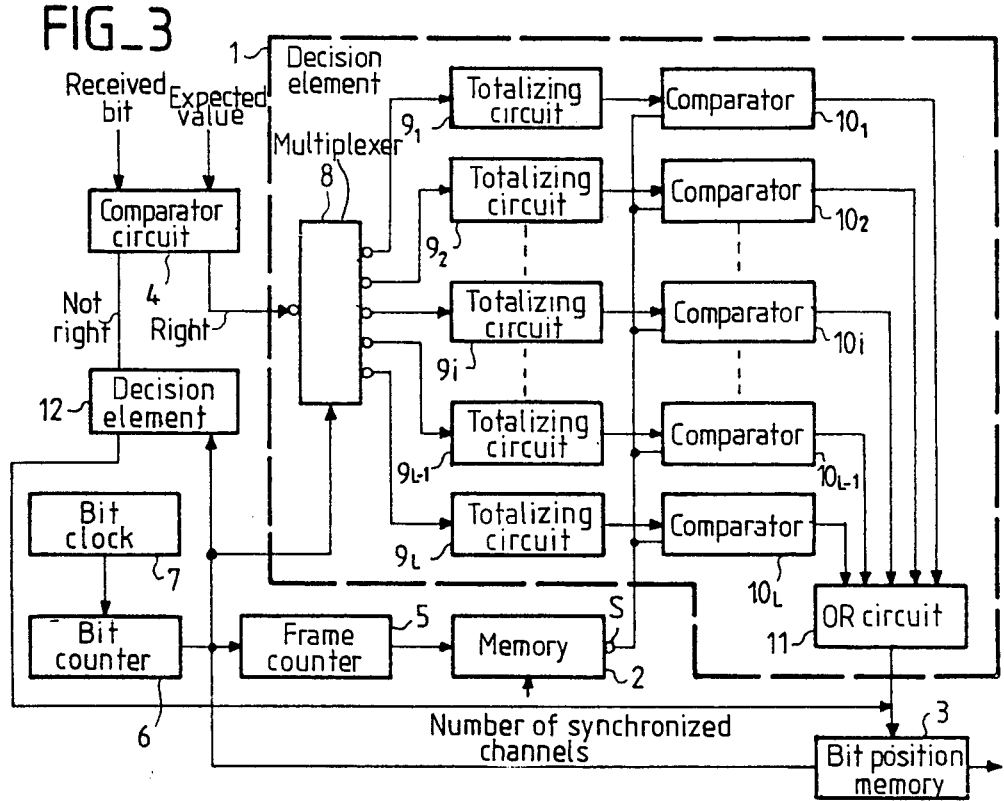
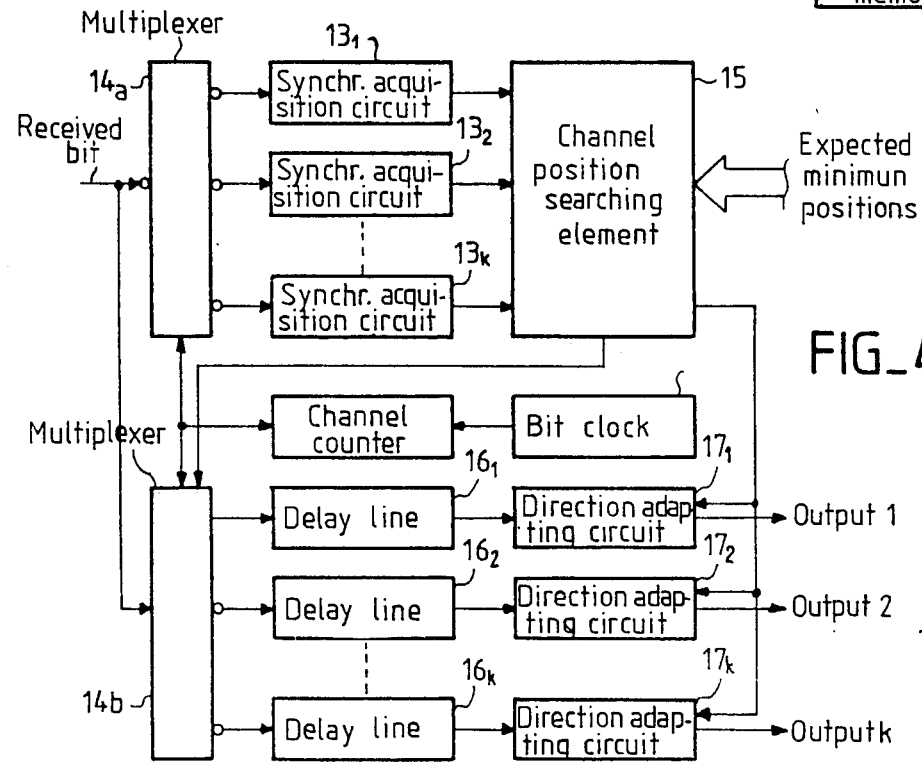

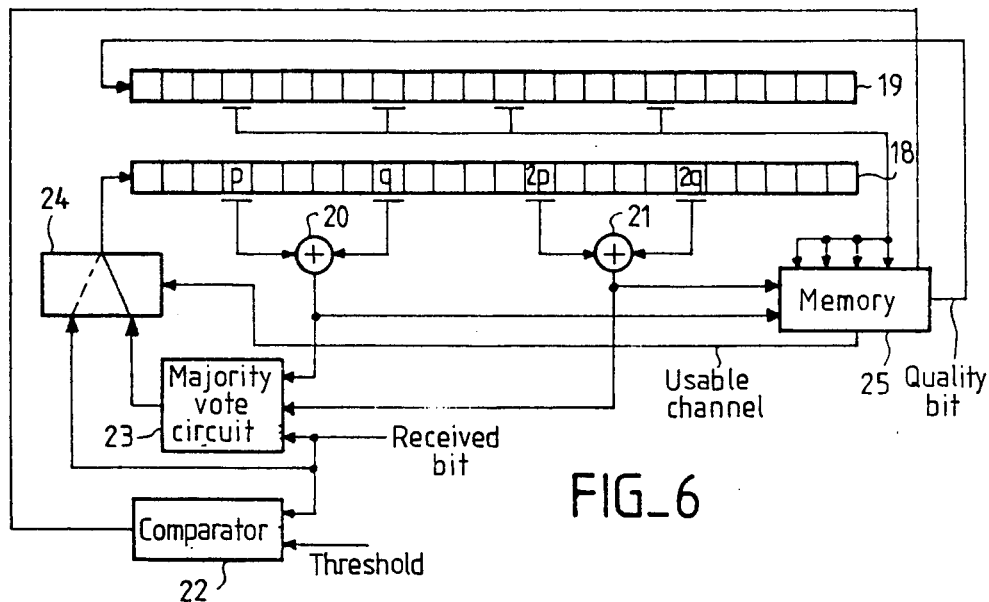
FIG_6
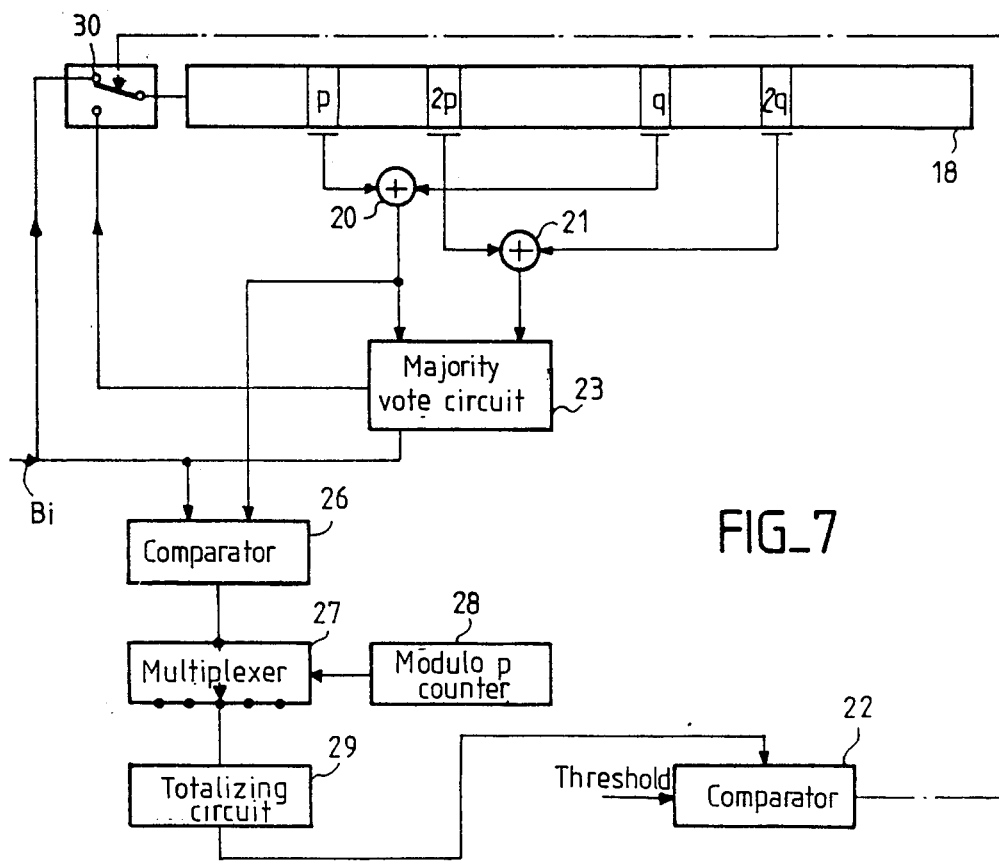
FIG_7

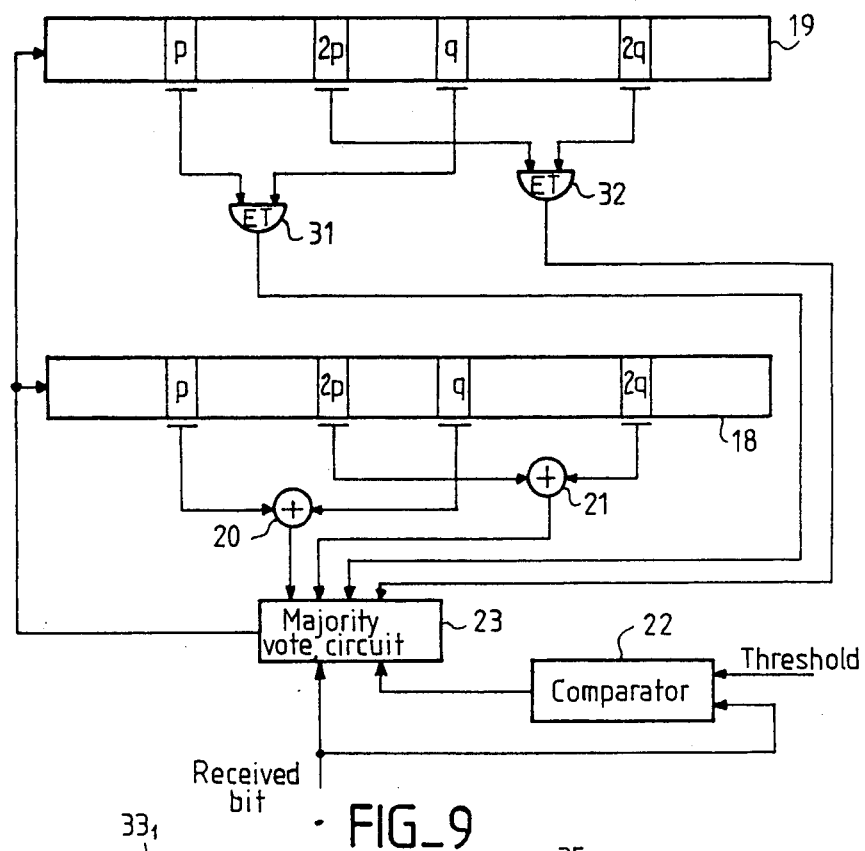
FIG_8
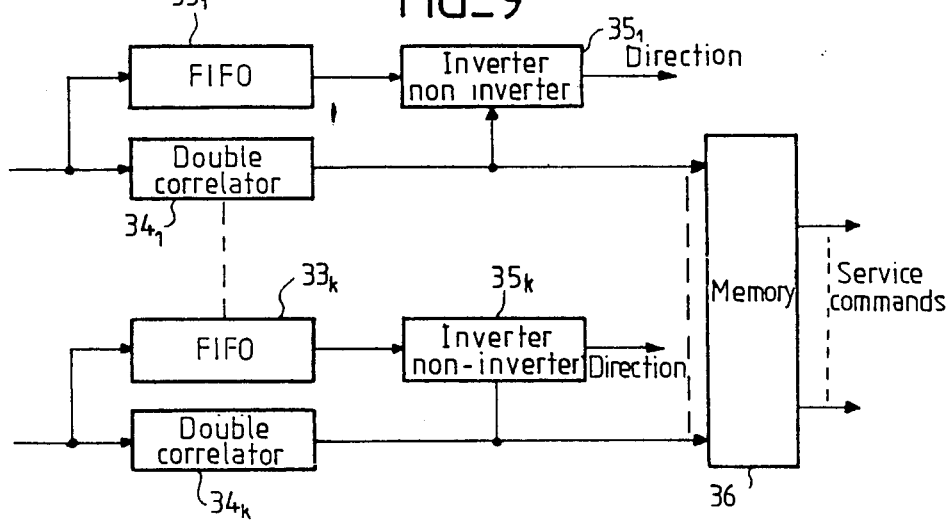
FIG_9

METHOD AND DEVICE FOR THE ACQUISITION OF SYNCHRONIZATION BITS IN DATA TRANSMISSION SYSTEMS

BACKGROUND OF THE INVENTION

1. The Field of the Invention

The present invention concerns a method and a device for the acquisition of synchronization bits in data transmission systems It can be applied especially to the transmission of encoded data by radio or cable wherein the flow of binary data transmitted is cut up into framed blocks.

In these transmissions, the pieces of information are conveyed in sequences of pseudo-random bits, and the bits given by the reception demodulators can represent one or more multiplexed channels, the multiplexing of the channels being generally done bit by bit.

2. Description of the Prior Art

According to a known embodiment, described in the THOMSON-CSF Journal, volume 18, No. 1. March 1986, published by Gauthier Villars, the synchronization bits in a multiplexed frame of messages are searched for by recognizing, in the sequence of pseudo-random bits, those bits which have the properties of Fibonacci sequences. This search enables the demultiplexing and makes it possible to automatically recognize the direction (direct or reversed) of the received bits. The synchronization is found by making correlations on each of the synchronized channels of the multiplex and, to reduce the probability of a false alarm, namely the probability of wrongly recognizing a bit, correlations are made on a defined fixed number of samples. However, this search cannot be done efficiently unless the receiver has prior knowledge of the format of the information emitted and, especially, unless it knows the multiplexed channels subjected to this synchronization. Furthermore, the method does not enable the total elimination of errors that occur on the synchronization bits, thus making it difficult to use them as time markers, for example for cipher equipment.

Another known method can be used, however, to partially cope with this latter drawback. According to this method, the sequence of bits of the pseudo-random sequence of bits received is compared with a pseudo-random sequence of the same generation. However, for a frame with a length L, the search for the synchronization can last the time taken for L elementary tests performed on N frames, N being defined by the depth of the register of transmitted pseudo-random sequences wherein the synchronization bits are generated. Furthermore, these tests are, all the same, conducted even there are no errors. Each test proper takes place on N bits which follow the first N bits already entered in a register with a length 2N. Each received bit is compared with the sum that was used to generate it in the transmission enciphering device. At the end of the test, the frame is rejected if the number of differences obtained is greater than a defined threshold. A majority vote is also taken among the following bits reaching the register and the sums coming from the bits of the register to eliminate the simple errors, thus making it possible, in the event of error, to introduce a number of voted bits into the register by internal looping. The synchronization is achieved in these circumstances if there has been less than a maximum number of differences between the received bits and the bits generated by the internal looping of the register.

However, in addition to the fact that, with this method, the acquisition of the synchronization takes a relatively long time, possibly greater than L times the length N of the register which gives the synchronization pseudo-random bits at transmission, a blockage of the reception register is got or again, a systematic introduction of erroneous bits into this register, especially when the tests concern regularly erroneous bits.

The purpose of the invention is to remove the above-mentioned drawbacks.

SUMMARY OF THE INVENTION

To this end, an object of the invention is a method for the acquisition of synchronization bits in systems for the transmission of data transmitted between at least one transmitter and one receiver, of the type in which the flow of information exchanged between a transmitter and a receiver is cut up into framed blocks belonging to one or more channels, each synchronized frame being separated from the following frame by at least one synchronization bit, comprising the steps of making a comparison, modulo the number of bits contained in a frame, the value of each of the bits received with the pre-supposed values of the synchronization bits, totalizing the results of the comparisons made on each bit and identifying, in the received bits, the bit positions modulo the number of bits contained in a frame for which the totals obtained are greater than an adjustable threshold value, modulo the number of bits contained in a frame, as a function of the number of comparisons already made for each bit of a frame and adapted according to the probabilities of false alarms and of non-detection which characterize the transmission.

Another object of the invention is a device for the implementing of the above-mentioned method.

The method and device according to the invention have the main advantage of enabling the fast determining of the position of a frame synchronization bit and, consequently, of the position of each of the bits of the frame, the recognizing of the presence of an inversion of a received bit and the performance of a total error correction on the synchronization bits. Because this correction can be total, it then becomes possible, with the method of the invention, to use the synchronization bits in the transmission of certain special messages by introducing deliberate errors, at the instant of transmission, to give all the synchronization bits transmitted special configurations corresponding to certain types of messages which the user seeks to transmit.

BRIEF DESCRIPTION OF THE DRAWINGS

Other features and advantages of the invention will emerge below from the following description, made with reference to the appended drawings, of which:

FIG. 1 shows the format of an elementary frame;

FIG. 2 shows an example of juxtaposed multiplexed frames;

FIG. 3 shows an example of an implementation of the method according to the invention;

FIG. 4 shows an extension of the method according to the invention to the making of a device having k multiplexed channels;

FIGS. 5A, 5B, and 5C show multiplexed frames;

FIG. 6 shows a device to determine the values of the expected bits;

FIGS. 7 and 8 show alternative embodiments of the device of FIG. 6;

FIG. 9 shows a device used to recognize the presence of inversion in the received synchronization bits.

DESCRIPTION OF THE PREFERRED EMBODIMENT

The method according to the invention, described below, consists in searching for the synchronization bits in frames of messages transmitted on several channels of a multiplex system, in eliminating the errors in the synchronization bits found, and in ensuring the follow-up of the synchronization on the various channels of the multiplex. Each elementary frame of a message has a format of the type shown in FIG. 1 and the juxtaposed frames, transmitted between the transmitter and the receivers, have the configuration shown in FIG. 2. In these two figures, the symbols $S_i$, $S_{i+1}$, $S_{i+2}$ designate the positions of the synchronization bits and, for each of the frames, they are followed by the bits of the transmitted message. It is assumed, in the rest of the description, that each of the frames has a determined length L.

The search for synchronization bits takes place by performing a correlation between the value of each received bit and its expected and assumed value, calculated in a known way by means of a generating polynomial which enables the generation of synchronization pseudo-random bits at transmission. These correlations consist in totalizing, on a determined number of successive frames, the number of times that each bit of a frame and its homologous bits, occupying the same position in the preceding frames, have the same value as the value of the expected synchronization bit. The totals thus obtained for each bit position are compared with a determined threshold value, and the position of the bit to which corresponds the first total greater than the determined threshold value is taken to correspond to the position of the synchronization bit.

According to the invention, when the multiplex system is reduced to a single channel, a first threshold value $S_1$ is defined as a function of a minimum number $N_1$ of correlations compatible with the probabilities of false alarm $P_{FA}$ and of non-detection $P_{ND}$ which characterize the transmission. Since the probability of recognizing a bit in any frame is equal to $\frac{1}{2}$, the probability of recognizing this same bit n times in $N_1$ successive frames is:

$$C_{N1}^n \cdot \left(\frac{1}{2}\right)^n \cdot \left(\frac{1}{2}\right)^{N-m} = C_{N1}^n \cdot \frac{1}{2^N}$$

with $$C_{N1}^n = \frac{N_1!}{N!(N_1 - n)!}$$

In this case, using a threshold $S_1$ to set the number of times that it is possible to wrongly recognize a synchronization bit on N transmitted frames, the probability of obtaining a value of n higher than the threshold $S_1$ is equal to:

$$\sum_{n=S_1}^{n=N} C_{N1}^n \cdot \frac{1}{2^{N_1}}$$

Conversely the above relations can be used, for a fixed probability of false alarms, to determine the decision threshold S as a function of the number N of analyzed frames.

Rather similarly, the threshold $S_1$ can be fixed by assessing the probability of non-detection $P_{ND}$ or, again, the probability with which the receiver will not recognize the expected synchronization bit. This corresponds, for example, to the case where the received signal has characteristics which are quite usable but for which the detected value does not correspond to the value of the transmitted bit because of the noise which taints the transmission. In this case, if $P_e$ is the probability with which the receiver can make an error on the value of a bit, the probability of recognizing n times the bit received on N transmitted frames is defined by the relationship:

$$C_{N1}^n \cdot (1 - P_e)^n \cdot P_e^{N-n}$$

The probability $P_{ND}$ of non-detection is then equal to:

$$\sum_{n=0}^{S_1-1} C_{N1}^n \cdot (1 - P_e)^n \cdot P_e^{N1-n}$$

for n below the fixed decision threshold $S_1$. Conversely, the preceding formula makes it possible, for a fixed non-detection probability $P_{ND}$, to determine the decision threshold $S_1$ as a function of the number N of analyzed frames. During the following elementary correlation, the receiver will have performed $N_2 = N_1 + 1$ correlations and, as previously, the total number of occurences of the desired synchronization bit value may be compared with a new threshold $S_2$, compatible with the same probabilities of false alarm $P_{FA}$ and non-detection $P_{ND}$.

The preceding process can thus be repeated for each following frame until a value $N_{max}$ where it can be guaranteed, if no totalizer has exceeded the decision threshold value, that the analyzed frames are not synchronized. The method thus makes it possible to obtain, at given false alarm $P_{FA}$ and non-detection $P_{ND}$ probabilities, a processing time which automatically gets adapted to transmission errors.

An example of a device for the implementation of the method according to the invention is shown in FIG. 3. This device has a first decision element 1 shown inside a broken line, coupled with a decision threshold memory 2 and a bit position memory 3. It also has a comparator circuit to compare the state of each received bit of a frame with the expected value of the synchronization bit, a frame counter to address the memory 2 depending on the number of analyzed frames and a bit counter 6, actuated by a bit clock circuit 7. The decision element 1 has a multiplexer circuit 8 with L outputs respectively coupled to a totalizing circuit of a set of totalizing circuits marked $9_1$, $9_L$ respectively. The multiplexer circuit 8 is coupled by its input to a first output of the comparator circuit 4. The contents of the totalizers $9_1$ to $9_L$ are respectively applied to a first input of comparator circuits, $10_1$ to $10_L$. The second input of the comparator circuits, $10_1$ to $10_L$, is coupled to the data output of the memory 2 to receive the decision threshold values. The outputs of the comparator circuits, $10_1$ to $10_L$, are connected respectively to the input of a logic OR circuit 11, the output of which is connected to a validation input of the bit position memory 3. The device also has a second decision element 12 identical to the first decision element 1, which is coupled to a second complementary output of the comparator circuit 4.

As indicated earlier, the comparator circuit 4 compares the value of each of the bits received with the expected value of a corresponding synchronization bit. The result of the comparison is directed towards to a totalizing circuit 9, at the bit clock rate, by the multiplexer 8 under the control of the bits counter 6. The content of each totalizing circuit can thus be increased by one unit each time that the totalizing circuit is coupled to the output of the comparator circuit 4 and each time that the received bit corresponds to the expected value. When the content of a totalizer circuit 9 reaches the predetermined threshold value which is read in the memory 2, the corresponding comparator circuit, which is coupled to its output, transmits, through the logic OR circuit 11, a signal that validates the bit position memory 3, thus making it possible to memorize the address of the bit given by the frame counter 5 in the memory 3.

The example which has just been described for a channel can be extended to an embodiment by which k channels can be used in the manner shown in FIG. 4. In this example k circuits, marked $13_1$ to $13_k$ respectively and identical to the circuit of FIG. 3, receive the bits to be compared through a multiplexer circuit $14_a$. The positions of the bits that it detects are transmitted to a channel position searching element 15. The channel searching element 15 compares the positions detected by each of the devices, $13_1$ to $13_k$, with an expected minimum channel position. The received bits are then shunted through a multiplexer $14_b$ to the channels of the receiving device through the delay lines $16_1$, $16_k$ and through direction adapting circuits $17_1$ to $17_k$. The multiplexers, $14_a$ and $14_b$, are controlled from a channel counter $14_c$ driven by the bit clock circuit 7.

However, at the frame of the multiplex system, of the type shown in FIG. 5A, 5B, 5C, and when several channels are synchronized, the existence of a false alarm probability $P_{FA}$ and non-detection probability $P_{ND}$ on each of the channels leads to a false alarm probability $P_T = (P_{FA})^{NBV}$ at the frame. In this formula, NBV designates the number of synchronized channels.

In order to preserve this constant value, the method according to the invention consists in increasing the probability of false alarm required the level of a channel as soon as another synchronized channel is discovered. The threshold values given by the memory 2 are then adjusted as a direct function of the number of synchronized channels. This makes it possible to reduce the number of correlations to be made and, hence, the duration of the stage in which the frame synchronization is searched for when the error rate is low, and to match the operation to it in order to provide for constant probabilities of false alarm $P_{FA}$ and non-detection $P_{ND}$.

In the example of FIGS. 3 and 4, the expected value of the bit results from the majority vote taken between the received bit and certain already received bits memorized in a shift register defined by the generating polynomial which enabled their transmission at the transmitter.

If, for example, the transmission generating polynomial has the form: $1 + x^p + x^q$, and if $B_i$ designates the received rank i bit entering the register, then, between the rank i+p and i+q bits, there is the relationship: $B_i = B_{i+p} \oplus B_{i+q}$, the symbol + representing the Exclusive-OR operator, or again the relationship:

$$B_i = B_{i+2p} \oplus B_{i+2q}$$

since:

$$B_{i+p} = B_{i+2p} \oplus B_{i+p+q}$$

and $$B_{i+q} = B_{i+p+q} \oplus B_{i+2q}$$

The majority vote can then be taken between the received bit, the result of $B_{i+p} \oplus B_{i+q}$ and the result of $B_{i+2p} \oplus B_{i+2q}$. By performing these processing operations, it is thus possible to eliminate a single error on the received bit when the value of this bit does not coincide with the value got from a majority vote taken between the received bit and the partial results of the operations $B_{i+p} \oplus B_{i+q}$ and $B_{i+2p} \oplus B_{i+2q}$.

In this case, it is the value of the majority vote that is injected into the register instead of the received bit.

However, to prevent the systematic injection of erroneous bits into the register during certain configurations, the method of the invention consists in taking a majority vote which is given a notion of quality. A corresponding device is shown in FIG. 6. It comprises a reception register 18 backed up by a quality register 19 which associates a quality bit with each received bit. It also has "exclusive-OR" circuits 20 and 21, the circuit 20 performing the "exclusive-OR" operation between the bit positions p and q in the register 18 and the "exclusive-OR" circuit 21 performing the "exclusive-OR" operation between the bits 2p and 2q positions in the register 18. The "exclusive-OR" circuits 20 and 21 thus perform a looping of the register 18, according to a relationship conforming to the polynomial relationship which was used for the generation of the pseudo-random bits at transmission. The comparator circuit 22 compares the level of the received bit with a predetermined noise threshold. Beyond this threshold, the received bit is declared to be right or to be of good quality. The received bit is applied at the same time as the values of the bits leaving the "exclusive-OR" circuits 20 and 21 at the input of a majority vote circuit 23 which takes a majority vote on these bits, the result of the vote being applied to a first input of a shunting circuit 24. The second input of the shunting circuit 24 receives the received bits. The shunting circuit 24 is controlled by the output of a memory 25, the addressing inputs of which are respectively connected to the corresponding bit positions p, q, 2p and 2q of the quality register 19 as well as to the output of the comparator circuit 22.

The memory 25 contains a table which enables the definition of the reliability of each of the elements of the vote and makes it possible to assess whether the vote taken by the circuit 23 can be used or not (in terms of quality and concordance of the elements of the vote) and to define the quality of the result for the injection of a quality bit in the register 19. If the vote can be used, the memory 25 positions the input of the register 18 on the output of the majority vote circuit 23, and the result of the vote is introduced into the register 18. On the contrary, if the vote cannot be used, the memory 25 controls the shunting circuit 24 so as to directly introduce the bit received into the input of the shift register 18 and the quality of this bit into the register 19.

According to another alternative embodiment of the device shown in FIG. 6, it is possible, rather than comparing the energy of each received bit with a threshold determining whether the bit is reliable or not, to estimate the shape factor of the wave received. This can be done very easily if the wave comes from a demodulator for example, by correlating the shape of the received bit with an expected shape to deduce a quality therefrom, giving the rate of confidence in the value of this bit.

However, when no criterion can be used to estimate this quality, another procedure may consist in choosing a mean value of the bits received for each frame position of the message. In this case, the device of FIG. 6 is modified in the manner shown in FIG. 7, where the quality register 9 is replaced by a device comprising a comparator circuit 26, a multiplexer circuit 27, a modulo p counter 28 and a totalizing circuit 29. In this case, the received bit $B_i$ is compared with the result of the "exclusive-OR" operation $B_{i+p} \oplus B_{i+q}$ obtained from the exclusive OR circuit 20 by means of the comparator circuit 26, and the result of the comparison is applied to a totalizing circuit 29 through a multiplexer 27 controlled by the modulo p counter 28. The content of the totalizing circuit 29 is compared by the comparator circuit 26 with a determined threshold and, if the result of the comparison is smaller than the determined threshold, the received bit is considered to be unreliable. It is then the result of the majority vote taken by the voting circuit 23 that is applied instead of the bit $B_i$ to the input of the register 18 by a shunting circuit 30. If not, if the result of the comparison is positive, the received bit is applied directly by the shunting circuit 30 to the input of the register 18.

Another alternative method shown in FIG. 8 consists in providing the sum of the bits, made by the exclusive-OR circuits 20 and 21, with a quality. This is obtained in FIG. 8 by AND circuits 31 and 32 which perform logic AND operations respectively on the bit p and q positions, firstly, and 2p, 2q, secondly, of the quality register 19. It is then the results of the "exclusive-OR" operations performed by the circuits 20, 21 and the results of the logic OR operations performed by the circuits 31 and 32 that are applied, at the same time as the bit received and the result of the comparison performed by the comparator 22, to the corresponding inputs of the majority vote circuit 23. The result of the majority vote is then applied directly, firstly to the input of the register 18 and, secondly, to the input of the register 19.

Obtaining the totally corrected bits inside the register 18 makes it possible to use the comparison with the bits received for purposes of indication for external operation devices (not shown) as well as their use as additional transmission channels. It also makes it possible to provide for the follow-up of synchronization should the signal disappear, while retaining the ability to follow the development of changes in transmission. For this, various correlations and time-lags are used to obtain a sequencing, without risk, of the various follow-up functions. In the register 18, it is always possible to make a permanent comparison of the result of the looping with the received bit. If the register contains at least one error, there is automatically a divergence between the locally generated sequences and the received sequence. A careful choice of the N degree irreducible polynomial thus enables the obtaining of a low self-correlation between the two sequences shifted by a length of $2^{N-1}$. By maintaining the number of occurrences above a certain threshold, it is possible to ensure that the register contains no errors. It is thus possible to generate a sequence of synchronization bits where all the errors have been eliminated. By counting the differences between the received bits and those generated locally, (the correlation rate), it is possible to know the error rate at the reception of these bits. Since the transmission errors occur identically on the synchronization bits and on the data bits, the estimation of the error rate on the synchronization bits is a direct reflection of the transmission error rate, and this error rate can be advantageously communicated to external communications managing or operating devices.

For applications where several channels are multiplexed and where only some are synchronized, the above described devices can be used to continue a local synchronization of the reception device in case of a loss of synchronization in an example where this takes place on all the synchronized channels. The valuable feature here is that, by maintaining the synchronization locally at the receiver, this receiver can at any time, when the cause of the loss of synchronization disappears, recover it. This enables the cipher equipment to resume the processing of messages directly without having to search for the synchronization bits of each of the multiplexed channels. On the contrary, the loss of synchronization on some channels only, when there remains at least one channel for which the correlation rate exceeds a given threshold makes it possible to assert that the phenomenon is located upline of the multiplexer and that it consists simply in a modification of the sequence of pseudo-random bits emitted. It will then be possible to search for this new sequence on the channels which no longer receive the synchronization bits while the other channels continue to function with the frame synchronization bit to which they have been previously linked.

One method of distinguishing between a total loss of synchronization and a partial loss of synchronization consists in generating the synchronization bits locally as soon as the loss of synchronization of a channel has been detected on this channel, by triggering a time lag. If the loss of synchronization is total on all the channels, the synchronization of each of the channels will continue to be generated locally by resetting the time lag and by re-triggering it as soon as the synchronization appears on a channel. At the end of the time lag, it could thus be certain that certain channels are no longer synchronized, while others have not undergone modification, thus making it possible to re-update the register of the first channels in order to start the process of convergence towards the new sequence.

According to another alternative embodiment of the invention, shown in FIG. 9, it is also possible to use shift registers $33_1 \ldots 33_k$ organized in stacks of the FIFO (first in first out) type for example, to achieve a fixed delay on each of the channels. This makes it possible to determine the presence of an inversion in a transmission by means of a double correlator $34_1 \ldots 34_k$, for example, on each of the channels, working in the short term, one on the received bit and the other on the reversed received bits. This improvement enables the detection of phenomena inherent in transmission, of the MSK type for example or, again, the detection of a change in a network or the presence of a deliberate modulation at a very low throughput rate for the purpose of remote signaling of commands on service channels for example. This inversion can be corrected without any loss of bits if the duration of the correlation is identical to the delay provided by the shift register for the inversion of the bits contained in the stack by means of inverting amplifiers $35_1$ to $35_k$. If this inversion occurs on all the synchronized channels, and if this configuration of modulation has been prohibited, it might then be assumed that it is total, and it could also be possible to invert the non-synchronized channels. On the contrary, if it has occurred on only one of the them, this inversion could be interpreted as a symbol which is emitted on the command channel. This symbol could then be decoded by a table contained in the memory 36 addressed according to whether the directions given by the correlators $34_1$ to $34_k$ are direct or inverted.

In the same way, in the case of a transmission with a very low error rate, the deliberate transmission of errors on these synchronization bits can be used as an additional channel at the very low throughput rate. These errors should have adequate redundancy to be recognized, but it could then be seen to it that they induce no configuration for the locking of the register 1, for example when certain configurations of double errors appear, so as not to delay the search for synchronization and convergence.

Naturally, the embodiments that have just been described are not the only ones which can enable a proper implementation of the invention.

For example, it is quite possible to envisage performing the various processing operations described above by means of a suitably programmed microprocessor architecture.

What is claimed is:

1. A method for acquisition of synchronization bits in systems for transmission of data transmitted between at least one transmitter and one receiver, of the type in which the flow of information exchanged between a transmitter and a receiver is cut up into frame blocks belonging to one or more channels, each synchronized frame being separated from the following frame by at least one synchronization bit, comprising the steps of:
   initially determining pre-supposed synchronization values;
   receiving a plurality of bits to be synchronized;
   making comparisons with said pre-supposed synchronization values, modulo a number of bits in a frame, and during a predetermined number of frames of the value of each of the bits received;
   totalizing results of the comparisons made on each bit in said making comparisons step;
   identifying, in the received bits, bit positions modulo the number of bits in a frame for which the totals obtained in said totalizing step are greater than an adjustable threshold value, modulo the number of bits contained in a frame, said threshold value being determined as a function of a number of comparisons already made in said making comparisons step for each bit of a frame and adapted according to probabilities of false alarms and of non-detection which characterize the transmission.

2. A method according to claim 1 comprising the further step of memorizing positions of the bits identified in the sequence of received bits to determine, according to their relative address, an order of the synchronized channels.

3. A method according to claim 2 comprising the further step of performing said totalizing step up to a maximum number corresponding to a number Nmax of frames, beyond which it can be ensured that, if no totalizing operation has exceeded the threshold value, the analyzed frames are not synchronized.

4. A method according to claim 3 wherein the pre-supposed values of the synchronization bits may be one of the two binary values "one" or "zero", and wherein said totalizing step is performed simultaneously upon the occurrence of an event, namely bit 1, and of its contrary, namely bit zero, to recognize inversions in the synchronization bits.

5. A method according to claim 4 wherein the synchronization bits are generated at transmission, following a sequence of pseudo-random bits.

6. A method according to claim 5 wherein said initially determining step includes multiplying the already received synchronization bits by a generating polynomial which was used to generate them at transmission, in order to obtain the pre-supposed value of a synchronization bit.

7. A method according to claim 6 further comprising the step of correcting the errors on the received synchronization bits by assigning, to each received synchronization bit, a bit reflecting its quality and by computing the expected value of each synchronization bit, by means of a majority vote weighted by the quality of the bits received.

8. A method according to claim 7 wherein modifications are provoked in the sequence of synchronization bits to transmit supplementary messages.

9. A method according to claim 8 wherein the error rate of the transmission is determined by measuring the error rate of the synchronization bits.

10. A method according to claim 9 further comprising the step in deciding, at all times, through correlations on the bits received, the holding of the synchronization without modifying it, or its modification only on that part which is modified at transmission.

11. A device for acquisition of synchronization bits in systems for transmission of data transmitted between at least one transmitter and one receiver comprising, in the receiver:
   first means for comparing, modulo a number of bits contained in a frame and during a predetermined number of frames, a value of each of the bits received with presupposed values of synchronization bits;
   second means, coupled to first means, for totalizing results of the comparisons made on each bit;
   third means for identifying in the received bits the bit positions, modulo a number of bits contained in a frame, for which the totals obtained are greater than an adjustable threshold value, said threshold value being determined as a function of a number of comparisons already executed for each bit of a frame and adapted according to probabilities of false alarms and of non detection which characterize the transmission.

12. A method according to anyone of the claims 1 to 10 wherein said receiving a plurality of bits step uses a radioelectric wave receiver.

* * * * *